A. WILLIAMS.
Nut-Locks.

No. 134,781.  Patented Jan. 14, 1873.

Attest;  
M. Gardner  
Edw. W. Down

Inventor;  
Aaron Williams  
By Johnston & Grindlay  
his attorneys

UNITED STATES PATENT OFFICE.

AARON WILLIAMS, OF BURRELL, PENNSYLVANIA.

IMPROVEMENT IN NUT-LOCKS.

Specification forming part of Letters Patent No. 134,781, dated January 14, 1873.

*To all whom it may concern:*

Be it known that I, AARON WILLIAMS, of Burrell, in the county of Westmoreland and State of Pennsylvania, have invented a certain new and useful Improvement in Self-Locking Nuts; and I do hereby declare that the following is a full, clear, and exact description thereof, reference being had to the accompanying drawing and to the letters of reference marked thereon.

The nature of my invention consists in providing bolts used in connection with fish-bars of railways with a nut the contour of which is a parallelogram in form, with its opening for the bolt eccentric to the nut, said opening having a recess in its walls.

To enable others skilled in the art to make and use my invention, I will proceed to describe its construction and operation.

Figure 1:
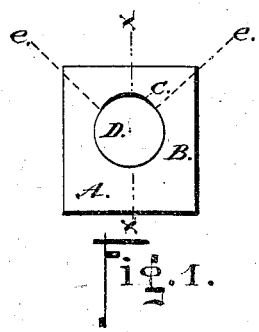
Figure 2:
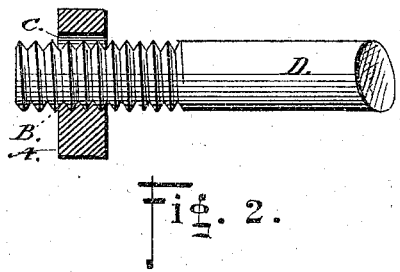

In the accompanying drawing, which forms part of my specification, Figure 1 is an end view of a bolt provided with my improved nut; and Fig. 2 is a vertical section of the same at line $x$ of Fig. 1.

In the accompanying drawing, A represents the nut, the contour of which is a parallelogram. The opening B is eccentric to the nut, with recess C in the wall of said opening. D represents the bolt, which is of ordinary construction.

The greatest weight of the nut A being below the axis of its opening, the tendency of the nut, by its own gravity, will be to remain always in the same position with relation to the bolt, and the recess C in the wall of the opening B will relieve the nut from the upward jar of the bolt D, thereby obviating the turning of the nut upon the bolt by the rattling and jarring action of the cars passing over the rails. The superior weight of the nut being on the under side of the bolt, and the recess C being on the upper side of it, the tendency of the nut during the jarring of the bolt will be to impinge upon the bolt at or about the points indicated at lines $e$ of Fig. 1.

What I claim as of my invention is—

The nut A, the contour of which is a parallelogram in form, with the opening B for the bolt eccentric to the nut, and provided with the recess C, substantially as herein described, and for the purpose set forth.

AARON WILLIAMS.

Witnesses:
   A. C. JOHNSTON,
   JAMES J. JOHNSTON.